US008379099B2

(12) United States Patent
Mizuno et al.

(10) Patent No.: US 8,379,099 B2
(45) Date of Patent: Feb. 19, 2013

(54) IMAGE CAPTURING DEVICE, IMAGE GENERATING DEVICE, MOVING PICTURE GENERATING METHOD AND COMPUTER-READABLE RECORDING MEDIUM

(75) Inventors: Kimiyasu Mizuno, Akishima (JP); Jun Muraki, Hamura (JP); Koki Dobashi, Musashino (JP)

(73) Assignee: Casio Computer Co., Ltd., Tokyo (JP)

( * ) Notice: Subject to any disclaimer, the term of this patent is extended or adjusted under 35 U.S.C. 154(b) by 95 days.

(21) Appl. No.: 13/103,422

(22) Filed: May 9, 2011

(65) Prior Publication Data
US 2011/0211086 A1 Sep. 1, 2011

Related U.S. Application Data

(62) Division of application No. 12/372,039, filed on Feb. 17, 2009.

(30) Foreign Application Priority Data

Feb. 19, 2008 (JP) ................................. 2008-036991

(51) Int. Cl.
*H04N 5/225* (2006.01)
*H04N 5/228* (2006.01)
(52) U.S. Cl. .................................. 348/220.1; 348/222.1
(58) Field of Classification Search ............... 348/220.1, 348/207.99, 222.1, 528, 143, 152, 154, 155, 348/231.2
See application file for complete search history.

(56) References Cited

U.S. PATENT DOCUMENTS

| | | | |
|---|---|---|---|
| 6,625,383 B1 | 9/2003 | Wakimoto et al. | |
| 7,391,956 B2 | 6/2008 | Wakimoto et al. | |
| 7,423,529 B2 | 9/2008 | Singer et al. | |
| 2003/0107648 A1 | 6/2003 | Stewart et al. | |
| 2007/0001836 A1 | 1/2007 | Singer et al. | |
| 2009/0097828 A1* | 4/2009 | Ishii | 348/231.2 |
| 2009/0207263 A1* | 8/2009 | Mizuno et al. | 348/220.1 |
| 2011/0044664 A1* | 2/2011 | Yukawa et al. | 348/43 |

FOREIGN PATENT DOCUMENTS

| | | |
|---|---|---|
| JP | 2001-008167 A | 1/2001 |
| JP | 2005-117083 A | 4/2005 |
| JP | 2005-149371 A | 6/2005 |
| JP | 2005-184095 A | 7/2005 |
| JP | 2005-184254 A | 7/2005 |
| JP | 2006-270793 A | 10/2006 |
| JP | 2007-251321 A | 9/2007 |
| WO | WO 99/03273 A1 | 1/1999 |

OTHER PUBLICATIONS

Japanese Office Action dated Jun. 21, 2011 (and English translation thereof) in counterpart Japanese Application No. 2010-034146. U.S. Office Action dated Apr. 3, 2012 in related, parent U.S. Appl. No. 12/372,039.
Japanese Office Action dated Jan. 19, 2010, and English translation thereof, issued in counterpart Japanese Application No. 2008-036991.

* cited by examiner

*Primary Examiner* — Aung S Moe
(74) *Attorney, Agent, or Firm* — Holtz, Holtz, Goodman & Chick, PC

(57) ABSTRACT

An image capturing unit outputs an image data signal. A first moving picture data generating unit generates first moving picture data based on the image signal from the image capturing unit. A trigger signal generating unit causes a trigger signal to be generated, every time a predetermined trigger condition is met, while the first moving picture data generating unit is in process of generating the first moving picture data. A second moving picture data generating unit causes, every time the trigger signal is generated, generation of moving picture data corresponding to an image signal of the predetermined period of time based on the point of time the trigger signal has been generated. A recording unit effects recording of the first moving picture data and the second moving picture data.

7 Claims, 11 Drawing Sheets

IMAGE CAPTURING DEVICE, IMAGE GENERATING DEVICE, MOVING PICTURE GENERATING METHOD AND COMPUTER-READABLE RECORDING MEDIUM

This is a Divisional of U.S. application Ser. No. 12/372,039, filed Feb. 17, 2009, which is based on Japanese Patent Application No. 2008-36991, filed Feb. 19, 2008, the entire contents of both of which are incorporated herein by reference.

BACKGROUND OF THE INVENTION

1. Field of the Invention

This invention relates to an image capturing device capable of taking a still picture and also generating a digested moving picture in the course of taking of a moving picture, an image generating device for generating the digested moving picture, a moving picture generating method of generating the digested moving picture, and a computer-readable recording medium having a program applied to generate the digested moving picture.

2. Description of the Related Art

In recent years, digital cameras of a type adaptable to take a still picture as well in the course of taking (recording) of a moving picture have been developed. For the digital cameras at the initial stage of development, taking the still picture, if effected in the course of taking of the moving picture, has caused recording to be interrupted for the period of time equivalent to recording for several frames before and after the point of time the still picture has been taken, resulting in generating no more than a discontinuous moving picture. However, the recently developed digital cameras have ensured that no interruption of recording is caused even if the still picture is taken in the course of taking of the moving picture, thus making it possible to generate a thoroughly continuous moving picture.

The digital camera of this type is suitably used to take a scene of a decisive moment that may come at any moment, specifically, provide recording of a scene of school sports and the like. This digital camera allows a user to take the still picture at one's desired timing after determining a composition while viewing a monitor-through image in the course of recording.

By the way, long-time moving picture data resulting from recording is frequently lacking in interest because of the presence of a large number of useless parts, causing the user to feel an urge to eliminate the useless parts by editing such the resultant long moving picture data. However, moving picture data editing is a troublesome work to the user, and it therefore follows that the moving picture resulting from recording with much effort is deleted in some cases without being subjected to a single view.

In this connection, there is proposed a reproducing device (see Unexamined Japanese Patent Application KOKAI Publication No. 2005-117083, for instance) capable of reproducing recorded moving picture data partially just as a digested version of the recorded moving picture data is obtained, without the need for the user to do any editing work. With the reproducing device of this type, long-time moving picture data resulting from recording and still picture data having been taken in the course of recording of the above long-time moving picture data are recorded in relation with each other. Then, the reproducing device of this type, when used in an attempt to reproduce the recorded still picture data in sequence (or to effect a slide show), is supposed to provide sequential reproducing of predetermined period's moving picture data having been recorded in relation with each still picture data, instead of reproducing of the above each still picture data. Use of the reproducing device of this type makes it possible to partially reproduce digested moving picture data of the period of time before and after the point of time the still picture has been taken, without the need to reproduce the long-time moving picture data directly.

More specifically, with the reproducing device of this type, if the still picture is taken in the course of taking of the moving picture, a flag indicating the timing that the still picture has been taken is inserted into the moving picture data to be generated. Then, in case of the slide show, after making a search for the flag having been inserted into the moving picture data, short-time moving picture data based on the point of time the flag has been inserted is reproduced. If it is assumed that the suitable number of flags have been inserted into the moving picture data, the short-time moving picture data corresponding to each flag may be reproduced in time series. According to the reproducing device of this type, it is sure that reproducing of the digested moving picture of the long-time moving picture data resulting from recording may be provided without the need to reproduce all the above long-time moving picture data.

However, the reproducing device as disclosed in the above Unexamined Japanese Patent Application KOKAI Publication No. 2005-117083 requires dedicated application software applied to, after making a search to find out that the flags having been inserted into the moving picture data are correlated, reproduce the short-time moving picture data based on the point of time each flag has been inserted. For this reason, the user makes use of only the reproducing device with the above dedicated application software installed in order to reproduce the digested moving picture, resulting in a lack of user's convenience.

SUMMARY OF THE INVENTION

Accordingly, an object of the present invention is to provide an image capturing device, an image generating device, a moving picture generating method and a computer-readable recording medium that are all adaptable to increase the user's convenience at the time of generating and reproducing a digested moving picture.

To attain the above object, an image capturing device according to a first aspect of the present invention comprises an image capturing unit for capturing a subject image to obtain an image signal, a first moving picture data generating unit for generating first moving picture data based on the image signal, a trigger signal generating unit for causing a trigger signal to be generated, every time a predetermined trigger condition is met, while the first moving picture data generating unit is in process of generating the first moving picture data, a second moving picture data generating unit for generating second moving picture data by causing, every time the trigger signal is generated, generation of moving picture data corresponding to the image signal of the predetermined period of time based on the point of time the trigger signal has been generated, and a recording unit for effecting recording of the first moving picture data and the second moving picture data.

A moving picture generating method according to a second aspect of the present invention comprises a first step of repeatedly determining whether or not a predetermined trigger condition has been met, while first moving picture data based on an image signal from an image capturing unit for capturing a subject image is in process of being generated, a second step of generating second moving picture data by causing, every time the predetermined trigger condition is met, generation of moving picture data corresponding to the image signal of the predetermined period of time based on the point of time the predetermined trigger condition has been met, and a third step of recording the first moving picture data and the second moving picture data in recording unit.

A computer-readable recording medium according to a third aspect of the present invention is characterized by having a program applied to cause a computer to execute processing including a first procedure of repeatedly determining whether or not a predetermined trigger condition has been met, while first moving picture data based on an image signal from an image capturing unit for capturing a subject image is in process of being generated, a second procedure of generating second moving picture data by causing, every time the predetermined trigger condition is met, generation of moving picture data corresponding to the image signal of the predetermined period of time based on the point of time the predetermined trigger condition has been met, and a third procedure of recording the first moving picture data and the second moving picture data in a recording unit.

An image generating device according to a fourth aspect of the present invention comprises a moving picture analyzing unit for, after analyzing first moving picture data, repeatedly determining, based on the result of analysis of the first moving picture data, whether or not a predetermined condition is met, a moving picture data generating unit for generating, every time the predetermined condition is met, second moving picture data corresponding to an image signal of the predetermined period of time based on the point of time the predetermined condition has been met, and a recording unit for effecting recording of the second moving picture data generated by the moving picture data generating unit.

A moving picture generating method according to a fifth aspect of the present invention comprises a first step of, after analyzing first moving picture data, repeatedly determining, based on the result of analysis of the first moving picture data, whether or not a predetermined condition is met, a second step of generating, every time the predetermined condition is met, second moving picture data corresponding to an image signal of the predetermined period of time based on the point of time the predetermined condition has been met, and a third step of recording the generated second moving picture data.

A computer-readable recording medium according to a sixth aspect of the present invention is characterized by having a program applied to cause a computer to execute processing including a first procedure of, after analyzing first moving picture data, repeatedly determining, based on the result of analysis of the first moving picture data, whether or not a predetermined condition is met, a second procedure of generating, every time the predetermined condition is met, second moving picture data corresponding to an image signal of the predetermined period of time based on the point time the predetermined condition has been met, and a third procedure of recording the generated second moving picture data.

BRIEF DESCRIPTION OF THE DRAWINGS

These objects and other objects and advantages of the present invention will become more apparent upon reading of the following detailed description of the accompanying drawings, in which.

DETAILED DESCRIPTION OF THE PREFERRED EMBODIMENTS

The first embodiment of the present invention is now described in detail with reference to the accompanying drawings.

Figure 1:
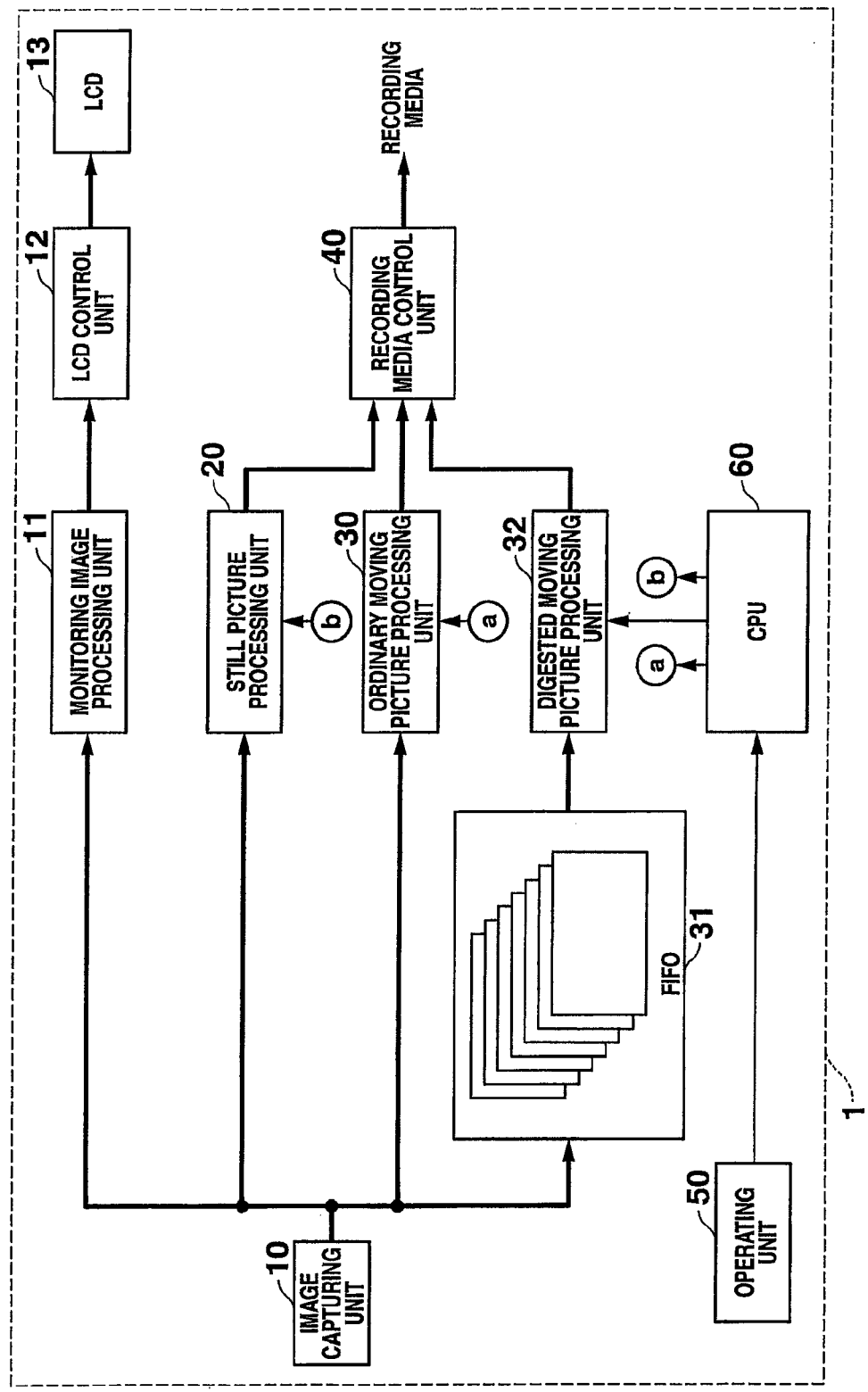
FIG. 1 is a block diagram illustrating the configuration of an image capturing device according to a first embodiment of the present invention.

FIG. 1 is a block diagram illustrating the functions of a digital camera 1 specified as an image capturing device according to the first embodiment of the present invention. As shown in FIG. 1, the digital camera 1 according to the first embodiment of the present invention comprises an image capturing unit 10 specified as image capturing unit, a monitoring image processing unit 11, a LCD control unit 12, a LCD 13, a still picture processing unit 20, an ordinary moving picture processing unit 30 specified as first moving picture data generating unit, a FIFO (first-in first-out) memory 31, a digested moving picture processing unit 32 specified as second moving picture generating unit, a recording media control unit 40 specified as recording unit, an operating unit 50 specified as trigger signal generating unit and a CPU 60.

The image capturing unit 10 has an optical system including an imaging lens and the like and an image sensor such as a CCD (Charge Coupled Device) and a CMOS, as well as their drive circuit and signal processing circuit (none of which are shown). The optical system includes the imaging lens, a stop mechanism and the like. When, with focusing and/or stop control effected by driving of the drive circuit, a luminous flux entered via the optical system reaches an image sensor surface, a subject image is formed on the image sensor surface. The luminous flux entered via the optical system comes to be incident upon an imaging surface (or a photo-detecting surface) of the image sensor. The image sensor captures the subject image to generate an image signal (or Bayer data) specified as the result of subject image capturing. The signal processing circuit provides control of communication between the signal processing circuit and the image sensor to perform processing such as readout of the Bayer data and developing with respect to the read Bayer data. It is noted that the developing processing as stated hereupon is the same as the R, G and B luminance data creation processing executed for each pixel contained in the Bayer data. The image capturing unit 10 results in outputting an image data signal having undergone the processing with the signal processing circuit.

The monitoring image processing unit 11 accepts entry of the image data signal outputted from the image capturing unit 10 to give image processing such as resizing and color converting to the entered image data signal, resulting in outputting the processed image data signal after translation into the form suited to monitoring.

The LCD control unit 12 accepts entry of the image data signal outputted from the monitoring image processing unit 11. The LCD control unit 12 controls the LCD 13 so that an image based on the entered image data signal will be displayed on the LCD 13. Controlling in this way causes the image captured by the image capturing unit 10 to be displayed in the so-called monitor-through display manner on the LCD 13. It is noted that the LCD 13 is the same as a liquid crystal display.

Like the monitoring image processing unit 11, the still picture processing unit 20 accepts entry of the image data signal outputted from the image capturing unit 10. In accordance with a command from the CPU 60, the still picture processing unit 20 accepts entry of the image data signal outputted from the image capturing unit 10 to give image processing such as resizing, color converting and compressing (JPEG (Joint Photographic Experts Groups), for instance) to the entered image data signal, resulting in generating and outputting still picture data for a single frame.

Like the still picture processing unit 20, the ordinary moving picture processing unit 30 accepts entry of the image data signal outputted from the image capturing unit 10. That is, the image data signal outputted from the image capturing unit 10 is entered into both the still picture processing unit 20 and the ordinary moving picture processing unit 30 at the same time. In accordance with a command from the CPU 60, the ordinary moving picture processing unit 30 accepts entry of the image data signal outputted from the image capturing unit 10 to give image processing such as resizing, color converting and compressing (processing based on H.264 standards, for instance) to the entered image data signal, resulting in generating and outputting a moving picture stream.

Like the ordinary moving picture processing unit 30, the FIFO memory 31 accepts entry of the image data signal outputted from the image capturing unit 10. That is, the image data signal outputted from the image capturing unit 10 is entered into all the still picture processing unit 20, the ordinary moving picture processing unit 30 and the FIFO memory 30 at the same time. It is noted that the FIFO memory 30 is the same as a first-in first-out memory. The FIFO memory 31 has a capacity sufficient to hold the image data signal from the image capturing unit 10 as much as the image data signal of the predetermined period of time. The FIFO memory 31 holds the entered image data signal for the predetermined period of time, and after a lapse of the predetermined period of time, outputs the held image data signal. The predetermined period of time as stated hereupon may be set at will. It is noted that the first embodiment of the present invention is described on the assumption that the predetermined period of time is given as three seconds, for instance.

In other words, the FIFO memory 31 of this type outputs the image data signal having been supplied from the image capturing unit 10 the predetermined period of time before, and hence, may be considered to be the same as delay unit for delaying the supplied image data signal the predetermined period of time.

In accordance with a command from the CPU 60, the digested moving picture processing unit 32 gives image processing such as resizing, color converting and compressing (H.264, for instance) to the image data signal supplied from the image capturing unit 10 via the FIFO memory 31, resulting in generating and outputting a moving picture stream of a digested moving picture. The digested moving picture processing unit 32 is adaptable to once stop and resume generating the moving picture stream of the digested moving picture after start of moving picture stream generation.

The recording media control unit 40 accepts entry of the still picture data from the still picture processing unit 20, the moving picture stream from the ordinary moving picture processing unit 30 and the moving picture stream from the digested moving picture processing unit 32, resulting in writing these entered data on individual recording media connected to the digital camera 1. Instances of available recording media of this type include optical disks such as DVD (Digital Versatile Disk), as well as SD (Square Digital) memory cards, smart media, flash memories and memory sticks. Though the still picture data from the still picture processing unit 20, the moving picture stream from the ordinary moving picture processing unit 30 and the moving picture stream from the digested moving picture processing unit 32 are sent to the recording media control unit 40 at the same time, the recording media control unit 40 allows for entry of these still picture data and moving picture streams at the same time. More than one recording medium is allowed to establish connection with the recording media control unit 40. The recording media control unit 40 is adaptable to record, in the individual recording media, the still picture data from the still picture processing unit 20, the moving picture stream from the ordinary moving picture processing unit 30 and the moving picture stream from the digested moving picture processing unit 32, respectively. In this manner, management of the moving pictures becomes facilitated.

The operating unit 50 has various types of buttons mounted to the outer surface of the body of the digital camera 1. Instances of these buttons include a shutter key, a recording button and a stop button. The operating unit 50 sends to the CPU 60 an operating signal meeting an operation entered by the user.

The CPU 60 generally controls each unit for the digital camera 1 depending on signals such as the operating signal from the operating unit 50. For instance, pushing down the shutter key at the operating unit 50 causes a shutter key operating signal to be sent from the operating unit 50 to the CPU 60. Upon receipt of the shutter key operating signal, the CPU 60 sends to the still picture processing unit 20 information (an operating start command) to the effect that the shutter key has been pushed down. In response to the sent command, the still picture processing unit 20 generates a single frame of still picture data.

Likewise, pushing down the recording button of the operating unit 50 causes a recording button operating signal to be sent from the operating unit 50 to the CPU 60. Upon receipt of the recording button operating signal, the CPU 60 sends the operating start command to the ordinary moving picture processing unit 30. In response to the sent command, the ordinary moving picture processing unit 30 starts generating the moving picture stream.

By the way, if the shutter key is pushed down at the operating unit 50 while the ordinary moving picture processing unit 30 is in process of generating the moving picture stream, the shutter key operating signal is also sent from the operating unit 50 to the CPU 60. Upon receipt of the shutter key operating signal, the CPU 60 sends to the still picture processing unit 20 the information to the effect that the shutter key has been pushed down, and to the digested moving picture processing unit 32 the information (the operating start command) to the effect that the shutter key has been pushed down. In response to the sent information and command, the still picture processing unit 20 generates the single frame of still picture data, while the digested moving picture processing unit 32 starts generating the moving picture stream of the digested moving picture.

The CPU 60 also has an internal timer (not shown). It is noted that this internal timer is the same as a management timer used to manage the time taken for generating the moving picture stream of the digested moving picture at the digested moving picture processing unit 32. With the management timer of this type, time measuring is started at the point of time the shutter key is pushed down while the ordinary moving picture processing unit 30 is in process of generating the moving picture stream. Then, when a value of time measuring with the management timer reaches a set value, the CPU 60 sends to the digested moving picture processing unit 32 a command to temporarily stop generating the moving picture stream of the digested moving picture. In response to the sent command, the digested moving picture processing unit 32 once stops generating the moving picture stream of the digested moving picture. Upon re-receipt of the operating start command from the CPU 60, the digested moving picture processing unit 32 resumes generating the moving picture stream of the digested moving picture. As the management timer of this type, a built-in counter contained in the CPU 60 or a general counter adaptable to count the elapsed time may be used.

Likewise, pushing down the stop button of the operating unit 50 causes a stop button operating signal to be sent from the operating unit 50 to the CPU 60. Upon receipt of the stop button operating signal, the CPU 60 sends a stop command to both the ordinary moving picture processing unit 30 and the digested moving picture processing unit 32. In response to the sent command, both the ordinary moving picture processing unit 30 and the digested moving picture processing unit 32 stop generating the moving picture stream.

Figure 2:
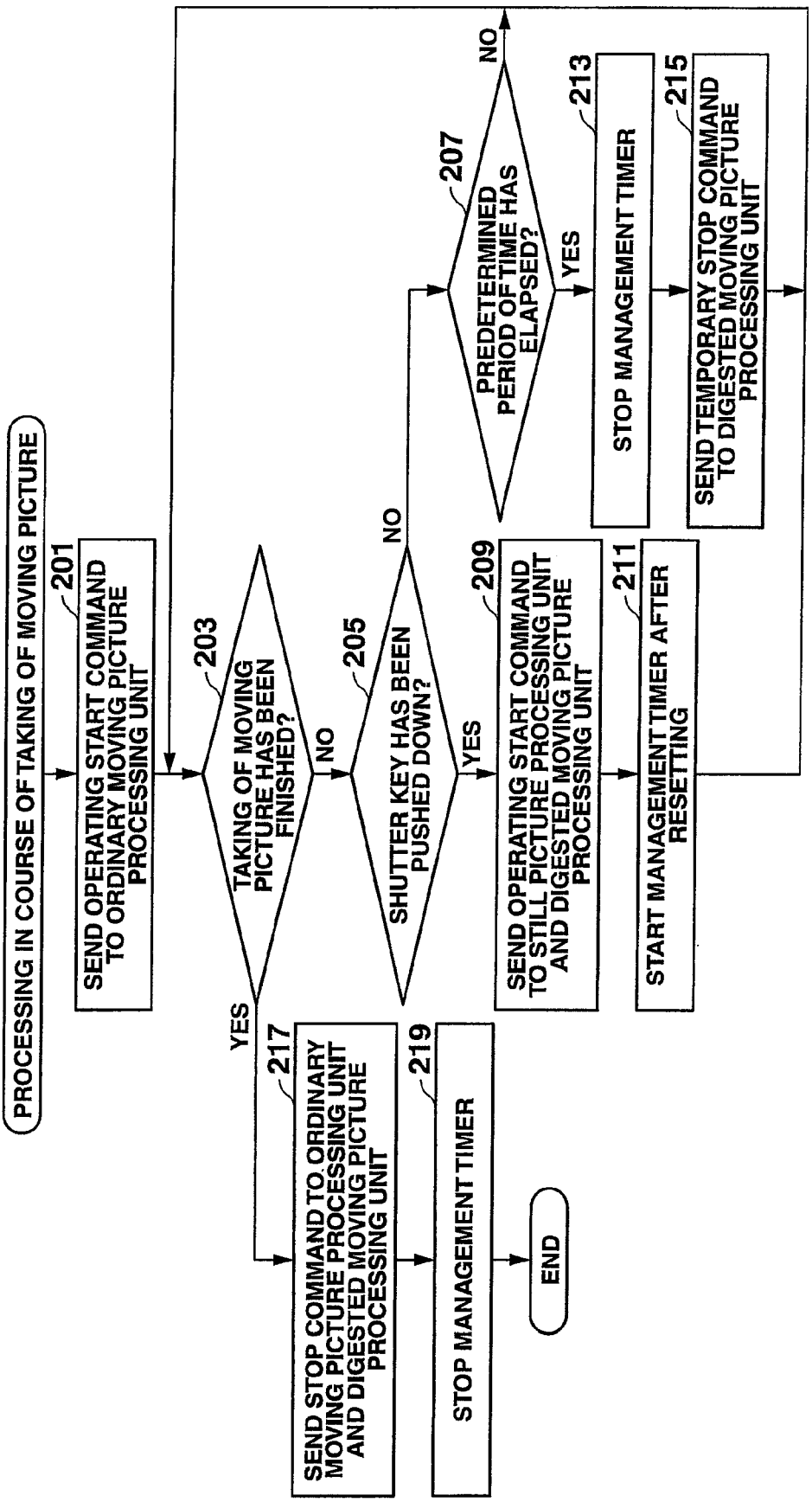
FIG. 2 is a flowchart of the processing executed by a CPU at the image capturing device shown in FIG. 1 since a user has started taking a moving picture.

An operation of the digital camera 1 according to the first embodiment of the present invention is now described. FIG. 2 is a flowchart of the processing (or the processing in the course of taking of the moving picture) executed by the CPU 60 since the user has started taking the moving picture. Pushing down the recording button of the operating unit 50 by the user brings the processing shown into start in running.

As shown in FIG. 2, when the recording button of the operating unit 50 is pushed down by the user, the CPU 60 firstly, at Step 201, sends the operating start command to the ordinary moving picture processing unit 30 upon receipt of the recording button operating signal. In response to the sent command, the ordinary moving picture processing unit 30 starts generating the moving picture stream. The moving picture stream generated by the ordinary moving picture processing unit 30 is sent to the recording media control unit 40, followed by being recorded in the recording medium (specified as a first recording medium).

Subsequently at Step 203, the CPU 60 judges whether or not it is necessary to finish taking the moving picture. It is judged based on whether or not the stop button of the operating unit 50 has been pushed down by the user, more specifically, whether or not the stop button operating signal has been sent from the operating unit 50 to the CPU 60. If the stop button is not subjected to pushing-down yet here, a negative result is obtained to cause the processing by the CPU 60 to move on to Step 205.

At Step 205, the CPU 60 judges whether or not the shutter key has been pushed down. If the shutter key is not subjected to pushing-down yet, a negative result is obtained to cause the processing by the CPU 60 to move on to Step 207. At Step 207, the CPU 60 judges whether or not the predetermined period of time has elapsed since startup of the management timer. Because of no startup of the management timer yet here, a negative result is obtained to cause the processing by the CPU 60 to return to Step 203. In this way, the procedure sequence of Steps 203→205→207 is repeated until the shutter key or the stop button is pushed down at the operating unit 50 by the user, or the predetermined period of time has elapsed since startup of the management timer.

During repetition of the above procedure sequence, the moving picture stream based on the image captured by the image capturing unit 10 keeps being generated by the ordinary moving picture processing unit 30, followed by being supplied via the recording media control unit 40 to the recording medium for preservation. Meanwhile, the image captured by the image capturing unit 10 is displayed in the monitor-through display manner on the LCD 13 via both the monitoring image processing unit 11 and the LCD control unit 12. Accordingly, the user may determine a composition for taking the still picture while viewing the image on the LCD 13.

If under repetition of the procedure sequence of Steps 203→205→207, the shutter key of the operating unit 50 is pushed down to cause the operating signal to that effect to be entered into the CPU 60, an affirmative result is obtained at Step 205 to cause the processing by the CPU to move on to Step 209. At Step 209, the CPU 60 sends, to both the still picture processing unit 20 and the digested moving picture processing unit 32 at the same time, the information (the operating start command) to the effect that the shutter key has been pushed down. Upon receipt of the sent information to the effect that the shutter key has been pushed down, the still picture processing unit 20 generates the still picture data for the single frame, while the digested moving picture processing unit 32 starts generating the moving picture stream of the digested moving picture. The still picture data generated by the still picture processing unit 20 is sent to the recording media control unit 40. The recording media control unit 40 effects, concurrently with recording of the moving picture stream generated by the ordinary moving picture processing unit 30 in the recording medium, recording of the sent still picture data in the recording medium different from the above. At the same time as the processing on the still picture data described above, the moving picture stream generated by the digested moving picture processing unit 32 is also sent to the recording media control unit 40. The recording media control unit 40 effects, concurrently with recording of the moving picture stream sent from the ordinary moving picture processing unit 30 in the recording medium, recording of the sent moving picture stream of the digested moving picture in the recording medium (specified as a second recording medium) further different from the above.

Subsequently at Step 211, the CPU 60 causes the management timer to start time measuring after resetting to 0. The FIFO memory 31 holds the image data signal from the image capturing unit 10 as much as the image data signal corresponding to the moving picture stream of the period of three seconds, so that the image data signal of three seconds before is supposed to be entered into the digested moving picture processing unit 32 at the point of time the operating start command has been received. Thus, with the digested moving picture processing unit 32, generation of the moving picture stream with the image data signal of three seconds before the point of time the shutter key is pushed down is caused.

On termination of the processing at Step 211, the processing by the CPU 60 returns to Step 203. Afterwards, the procedure sequence of Steps 203→205→207 is repeated until the shutter key is pushed down, or the stop button is pushed down to finish taking the moving picture, or the predetermined period of time (six seconds, for instance) has elapsed since startup of the management timer. During repetition of the above procedure sequence, both the ordinary moving picture processing unit 30 and the digested moving picture processing unit 32 keep generating the moving picture streams, while the recording media control unit 40 keeps recording these generated moving picture streams in the individual recording media at the same time.

Now assume that the predetermined period of time (six seconds, for instance) has elapsed since startup of the management timer, and hence, an affirmative result is obtained at Step 207. In this case, the processing by the CPU 60 moves on to Step 213, where the CPU 60 causes the management timer to stop. Subsequently at Step 215, the CPU 60 sends a temporary stop command to the digested moving picture processing unit 32. In response to the sent command, the digested moving picture processing unit 32 once stops generating and outputting the moving picture stream of the digested moving picture.

It is noted that the digested moving picture processing unit 32 starts generating the moving picture stream with the image data signal of threes seconds before the point of time the shutter key is pushed down, and it therefore follows that the moving picture stream of the period of three seconds each before and after the point of time the shutter key is pushed down is supposed to have been already generated when the period of six seconds has elapsed since start of operating of the digested moving picture processing unit 32.

On termination of the processing at Step 215, the processing by the CPU 60 returns to Step 203. Afterwards, the procedure sequence of Steps 203→205→207 is repeated until the shutter key is pushed down, or the stop button is pushed down to finish taking the moving picture, or the predetermined period of time has elapsed since restart of the management timer.

Afterwards, if the shutter key is re-pushed down, an affirmative result is obtained at Step 205, in which case, the CPU 60 sends, at Step 209, to both the still picture processing unit 20 and the digested moving picture processing unit 32 at the same time, the information to the effect that the shutter key has been pushed down, and then at Step 211, causes the management timer to start time measuring after resetting. In response to the sent information, the still picture processing unit 20 generates the single frame of still picture data, while the digested moving picture processing unit 32 resumes generating and outputting the moving picture stream. Thereby, the still picture data is sent from the still picture processing unit 20 to the recording media control unit 40, followed by being recorded in the recording medium. In synchronization with the processing on the still picture data described above, entry of the moving picture stream of the digested moving picture from the digested moving picture processing unit 32 into the recording media control unit 40 is resumed, so that the recording media control unit 40 causes the entered moving picture stream to be recorded in the recording medium so as to follow the moving picture data that stays from the point of time the entry of the moving picture data has been once stopped.

Afterwards, the procedure sequence of Steps 203→205→207 is repeated until the shutter key is pushed down, or the stop button is pushed down to finish taking the moving picture. Then, if the predetermined period of time has elapsed, an affirmative result is obtained at Step 207, in which case, the CPU 60 causes, at Step 213, the management timer to stop, and then at Step 215, sends to the digested moving picture processing unit 32 the command to temporarily stop generating the moving picture. In response to the sent command, the digested moving picture processing unit 32 once stops generating and outputting the moving picture stream.

In this manner, every time the shutter key is pushed down while the ordinary moving picture processing unit 30 is in process of generating the moving picture stream, the CPU 60 causes the still picture processing unit 20 to generate the single frame of still picture data, and causes the digested moving picture processing unit 32 to start generating the moving picture stream, causing the management timer to start time measuring. Then, if the predetermined period of time has elapsed, the CPU 60 causes the management timer to stop, causing the digested moving picture processing unit 32 to temporarily stop generating the moving picture stream. Even during the above processing, the ordinary moving picture processing unit 30 keeps generating and outputting the moving picture stream without a break.

By the way, if the stop button is pushed down by the user to finish taking the moving picture, and hence, an affirmative result is obtained at Step 203, the processing by the CPU 60 moves on to Step 217. At Step 217, the CPU 60 sends the stop command to both the ordinary moving picture processing unit 30 and the digested moving picture processing unit 32. Upon receipt of the sent stop command, both the ordinary moving picture processing unit 30 and the digested moving picture processing unit 32 stop generating the moving picture stream. The recording media control unit 40 finishes recording the moving picture streams sent from both the ordinary moving picture processing unit 30 and the digested moving picture processing unit 32. Subsequently at Step 219, the CPU 60 causes the management timer to stop. After the execution of the processing at Step 219, the CPU 60 ends the processing according to the first embodiment.

Figure 3:
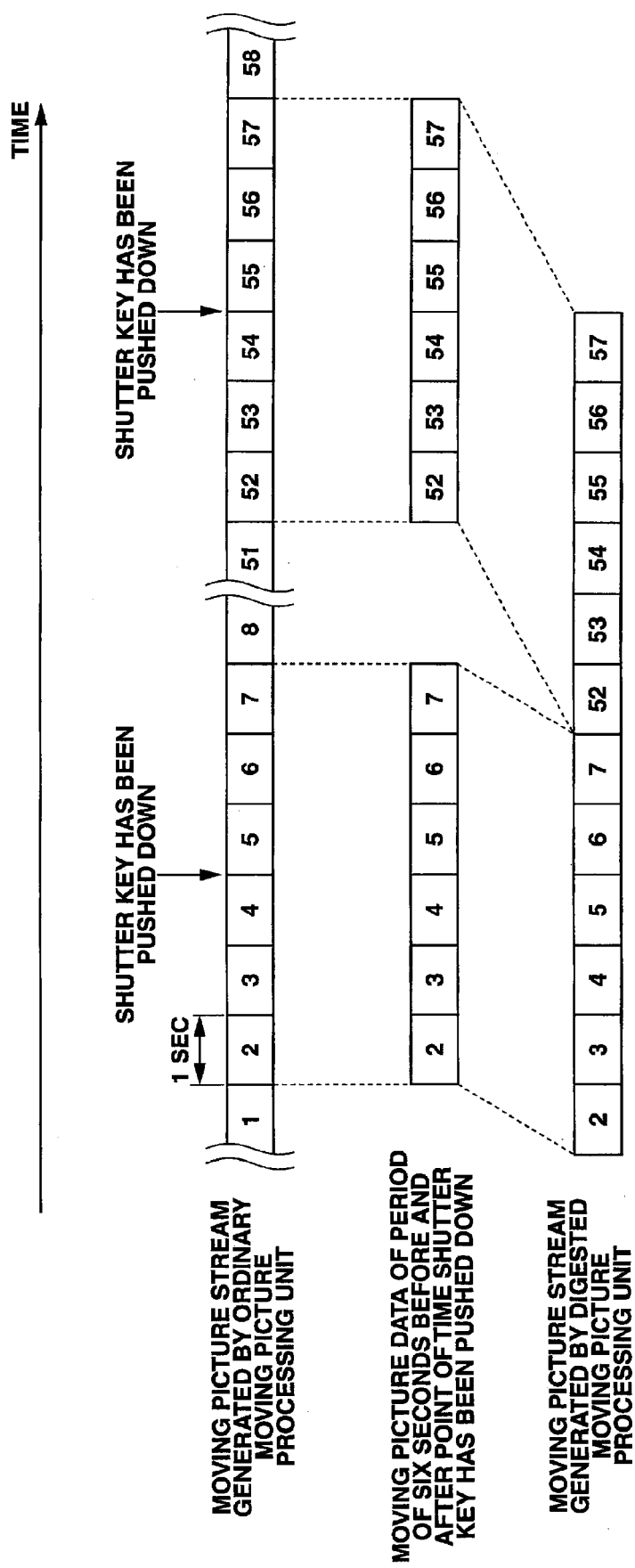
FIG. 3 illustrates one situation with respect to how a digest moving picture is generated at the image capturing device shown in FIG. 1.

The processing executed as described above enables the moving picture stream of the digested moving picture to be generated separately by the digested moving picture processing unit 32 concurrently with generation of the moving picture stream by the ordinary moving picture processing unit 30. FIG. 3 shows one situation with respect to how the digested moving picture is generated.

Referring to FIG. 3, the moving picture stream generated by the ordinary moving picture processing unit 30 is shown at the topmost stage. Each frame of the moving picture stream shown is numbered respectively. For the convenience of more simple description, FIG. 3 gives a frame rate of the moving picture stream as 1 fps (frame per second). However, it is to be understood that the frame rate is given setting as quite high as 30 fps in a practical manner, for instance.

Now assume that the shutter key is pushed down at the operating unit 50 immediately after the moving picture stream of a 4-numbered frame has been generated at the ordinary moving picture processing unit 30 (that is, immediately before the moving picture stream of a 5-numbered frame is generated). In this case, the digested moving picture processing unit 32 allows for generation of the moving picture stream of the period of six seconds before and after the point of time the shutter key is pushed down, that is, the moving picture stream ranging from a 2-numbered frame to a 7-numbered frame. After having generated the moving picture stream of the 7-numbered frame, the digested moving picture processing unit 32 becomes conditioned to once stop generating the moving picture stream.

Likewise, assume that the shutter key is pushed down at the operating unit 50 immediately after the moving picture stream of a 54-numbered frame has been generated at the ordinary moving picture processing unit 30 (that is, immediately before the moving picture stream of a 55-numbered frame is generated). In this case, the digested moving picture processing unit 32 is caused to resume generating the moving picture stream, thus allowing for generation of the moving picture stream of the period of six seconds before and after the point of time the shutter key is pushed down, that is, the moving picture stream ranging from a 52-numbered frame to a 57-numbered frame. The recording media control unit 40 then causes the moving picture stream ranging from the 52-numbered frame to the 57-numbered frame to be recorded in the recording medium so as to follow the moving picture stream ranging from the 2-numbered frame to the 7-numbered frame.

Figure 4:
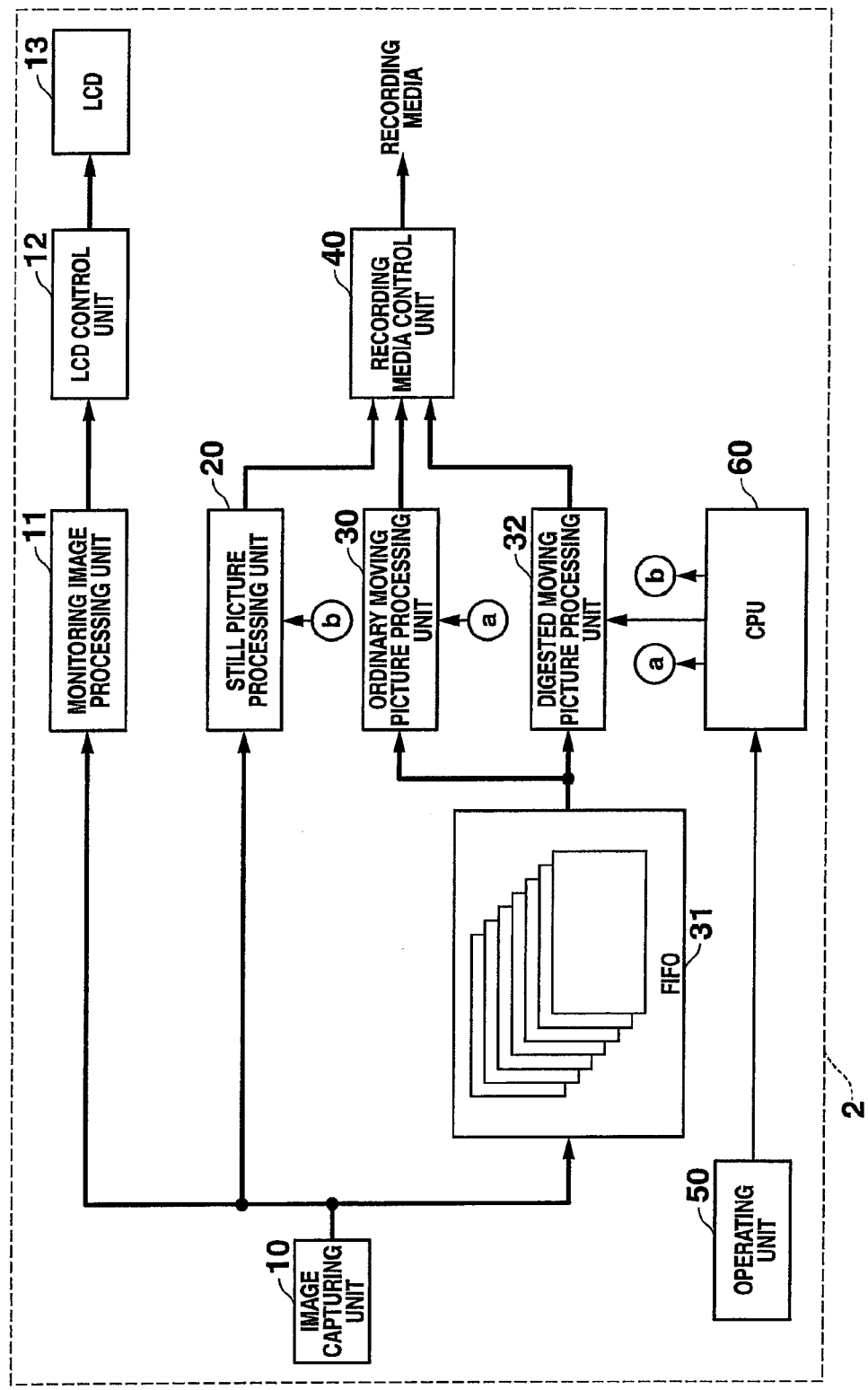
FIG. 4 is a block diagram illustrating the configuration of an image capturing device according to a second embodiment of the present invention.

The second embodiment of the present invention is now described. FIG. 4 is a block diagram illustrating the functions of a digital camera 2 according to the second embodiment of the present invention. Referring to FIG. 4, the digital camera 2 is different from the digital camera 1 shown in FIG. 1 in adapting the ordinary moving picture processing unit 30 to accept entry of the image data signal from the image capturing unit 10 via the FIFO memory 31 without direct entry of the image data signal from the image capturing unit 10. It is noted that for the second embodiment, the members or the units that are the same as the above first embodiment are denoted by the same reference numerals, and hence, their description is omitted.

As described above, the FIFO memory 31 is allowed to hold the image data signal from the image capturing unit 10 for the predetermined period of time, causing the image data signal entered into the ordinary moving picture processing unit 30 to be delayed the predetermined period of time, like the image data signal entered into the digested moving picture processing unit 32.

In this manner, the ordinary moving picture processing unit 30 also makes it possible to start generating the moving picture stream with the image data signal of the period of time before the point of time the recording button is pushed down by the user. Thereby, it becomes possible to pre-record an image of the period of time before the point of time the recording button is pushed down. In this manner, if a child or children spring into running so that the user misses one's chance of pushing down the recording button, for instance, it may become sure that the moving picture data at that moment may be recorded for preservation.

It is noted that it is also allowable to take a different configuration in which the FIFO memory 31 is arranged only at the pre-stage of the ordinary moving picture processing unit 30 without providing the FIFO memory 31 at the pre-stage of the digested moving picture processing unit 32.

Figure 5:
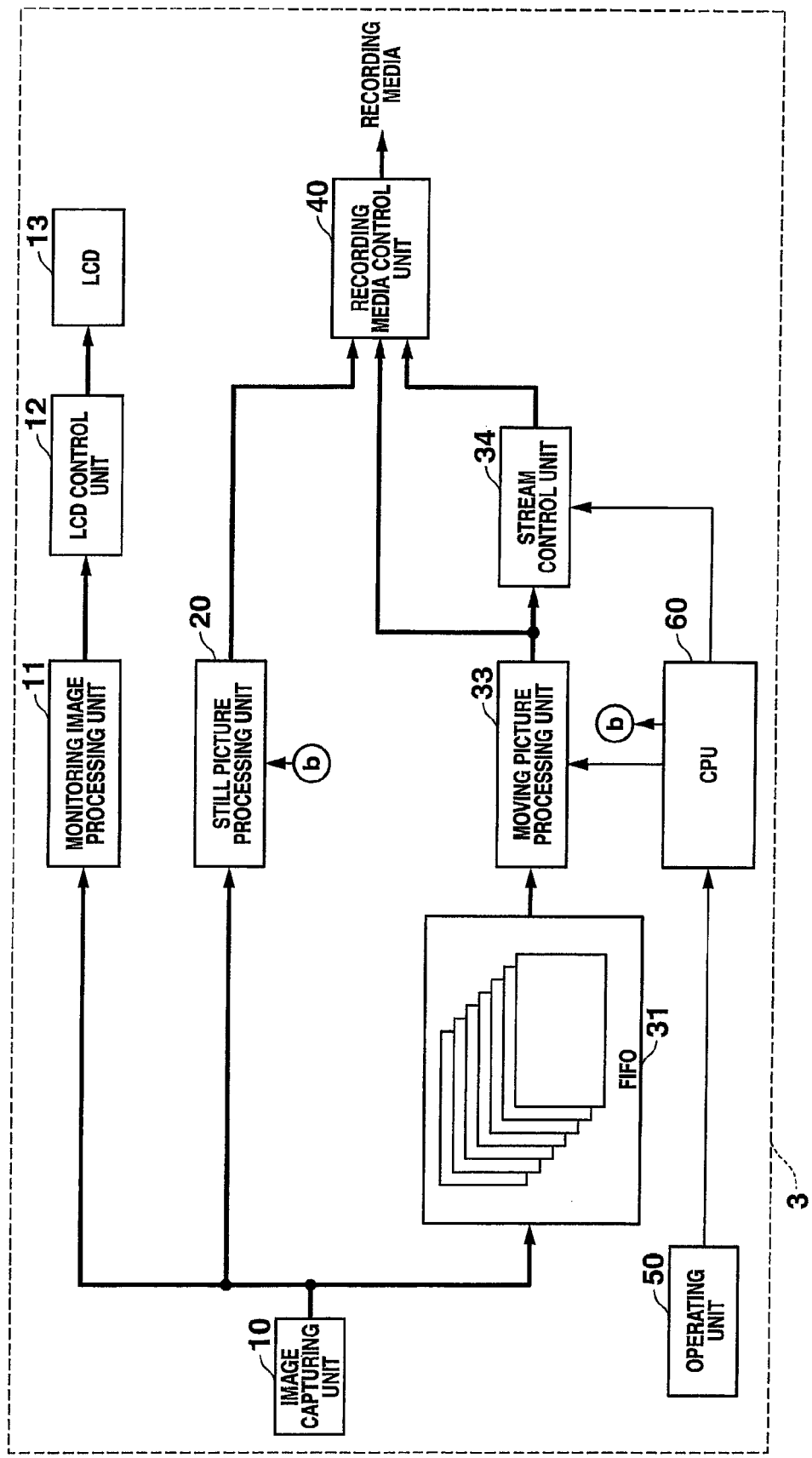
FIG. 5 is a block diagram illustrating the configuration of an image capturing device according to a third embodiment of the present invention.

The third embodiment of the present invention is now described. FIG. 5 is a block diagram illustrating the functions of a digital camera 3 according to the third embodiment of the present invention. Referring to FIG. 5, the digital camera 3 is different from the digital cameras 1 and 2 previously described according to the above first and second embodiments in uniting the moving picture processing units into one moving picture processing unit 33 to generate the moving picture stream and in further comprising a stream control unit 34 specified as second moving picture data generating unit. It is noted that for the third embodiment, the members or the units that are the same as the above first and second embodiments are denoted by the same reference numerals, and hence, their description is omitted.

In accordance with a command from the CPU 60, the moving picture processing unit 33 accepts entry of the image data signal outputted from the FIFO memory 31 to give image processing such as resizing, color converting and compressing (H.264, for instance) to the entered image data signal, resulting in generating and outputting the moving picture stream. That is, the moving picture processing unit 33 effects the same operation as the ordinary moving picture processing unit 30 previously described according to the above second embodiment. The moving picture processing unit 33 outputs the generated moving picture stream to both the recording medium control unit 40 and the stream control unit 34 at the same time.

The stream control unit 34 is arranged at the post-stage of the moving picture processing unit 33. In accordance with a command from the CPU 60, the stream control unit 34 extracts, from the moving picture stream supplied from the moving picture processing unit 33, the moving picture stream of the predetermined period of time. The moving picture stream extracted by the stream control unit 34 is sent to the recording media control unit 40. The recording media control unit 40 then causes the sent moving picture stream to be recorded in the recording medium. The moving picture stream directly sent from the moving picture processing unit 33 to the recording media control unit 40 is recorded as an ordinary moving picture, while the moving picture stream sent from the moving picture processing unit 33 to the recording media control unit 40 via the stream control unit 34 is recorded as a digested moving picture in the recording medium different from the recording medium in which the ordinary moving picture is to be recorded.

Figure 6:
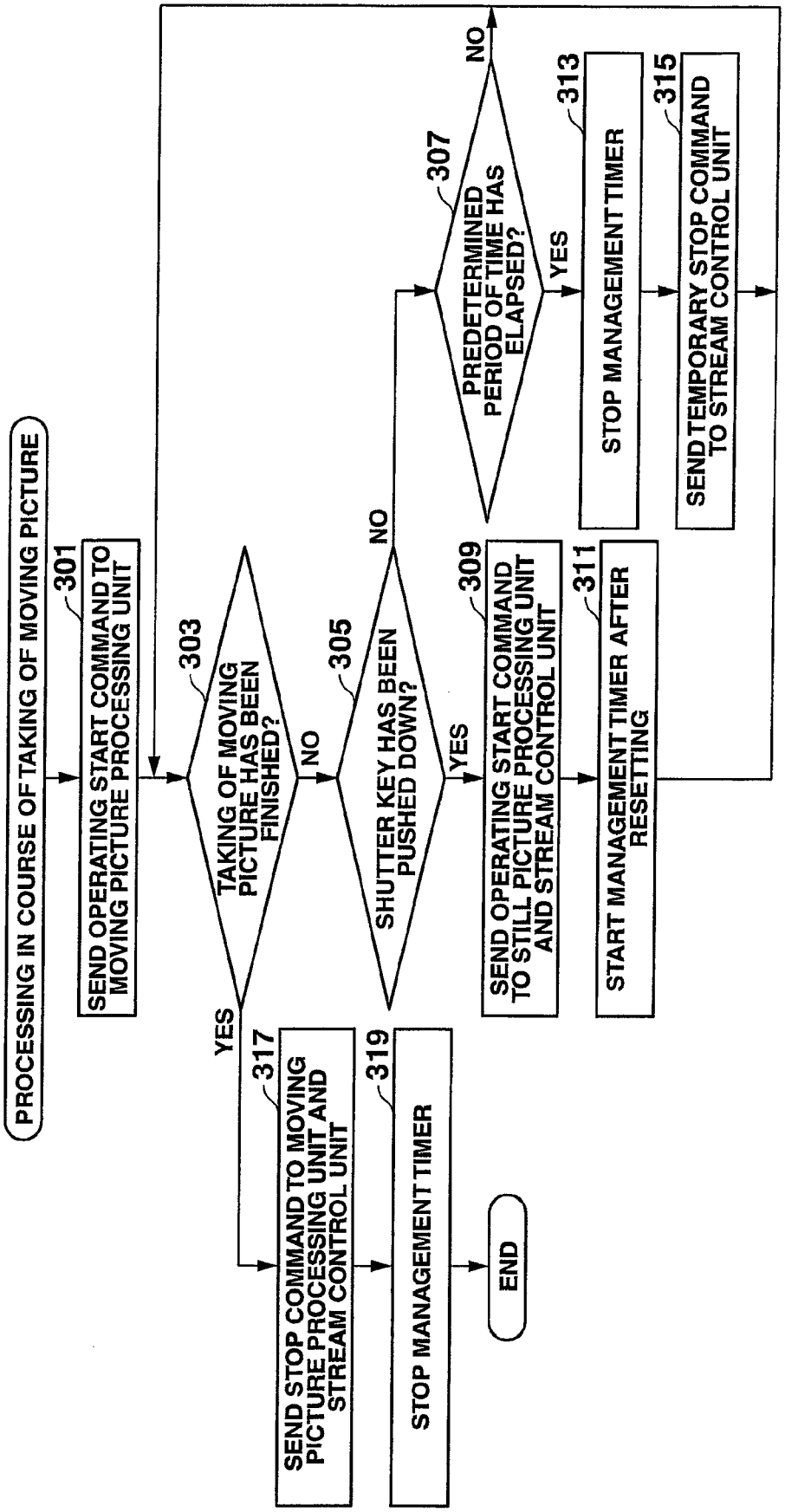
FIG. 6 is a flowchart of the processing executed by a CPU at the image capturing device shown in FIG. 5 since a user has started taking a moving picture.

FIG. 6 is a flowchart of the processing in the course of taking of the moving picture by the CPU 60 according to the third embodiment. The processing shown is different from the processing in the course of taking of the moving picture by the CPU 60 of the digital camera 1 shown in FIG. 2 in sending the command to the stream control unit 33, instead of to the digested moving picture processing unit 32.

The flow of the procedure sequence of Steps 301→303→305→307→303 . . . is the same as that of the procedure sequence of Steps 201→203→205→207→203 . . . shown in FIG. 2, and hence, their detailed description is omitted.

If the shutter key of the operating unit 50 is pushed down to cause an affirmative result to be obtained at Step 305, the processing by the CPU 60 moves on to Step 309. At Step 309, the CPU 60 sends to both the still picture processing unit 20 and the stream control unit 34 the information (the operating start command) to the effect that the shutter key has been pushed down, and then at Step 311, causes the management timer to start time measuring after resetting. On termination of the processing at Step 311, the CPU 60 returns to the flow of the procedure sequence of Steps 303→305→307→ 303 . . . .

Afterwards, if the value of time measuring with the management timer reaches a value or above indicating the lapse of the predetermined period of time, an affirmative result is obtained at Step 307, in which case, the CPU 60 causes, at Step 313, the management timer to stop, and then at Step 315, sends the temporary stop command to the stream control unit 34. Then, the CPU 60 returns to the flow of the procedure sequence of Steps 303→305→307→303 . . . .

If the stop button of the operating unit 50 is pushed down to cause an affirmative result to be obtained at Step 303, the CPU 60 sends, at Step 317, the stop command to both the moving picture processing unit 33 and the stream control unit 34, and then at Step 319, causes the management timer to stop. On termination of the processing at Step 319, the CPU 60 ends the processing according to the third embodiment.

Figure 7:
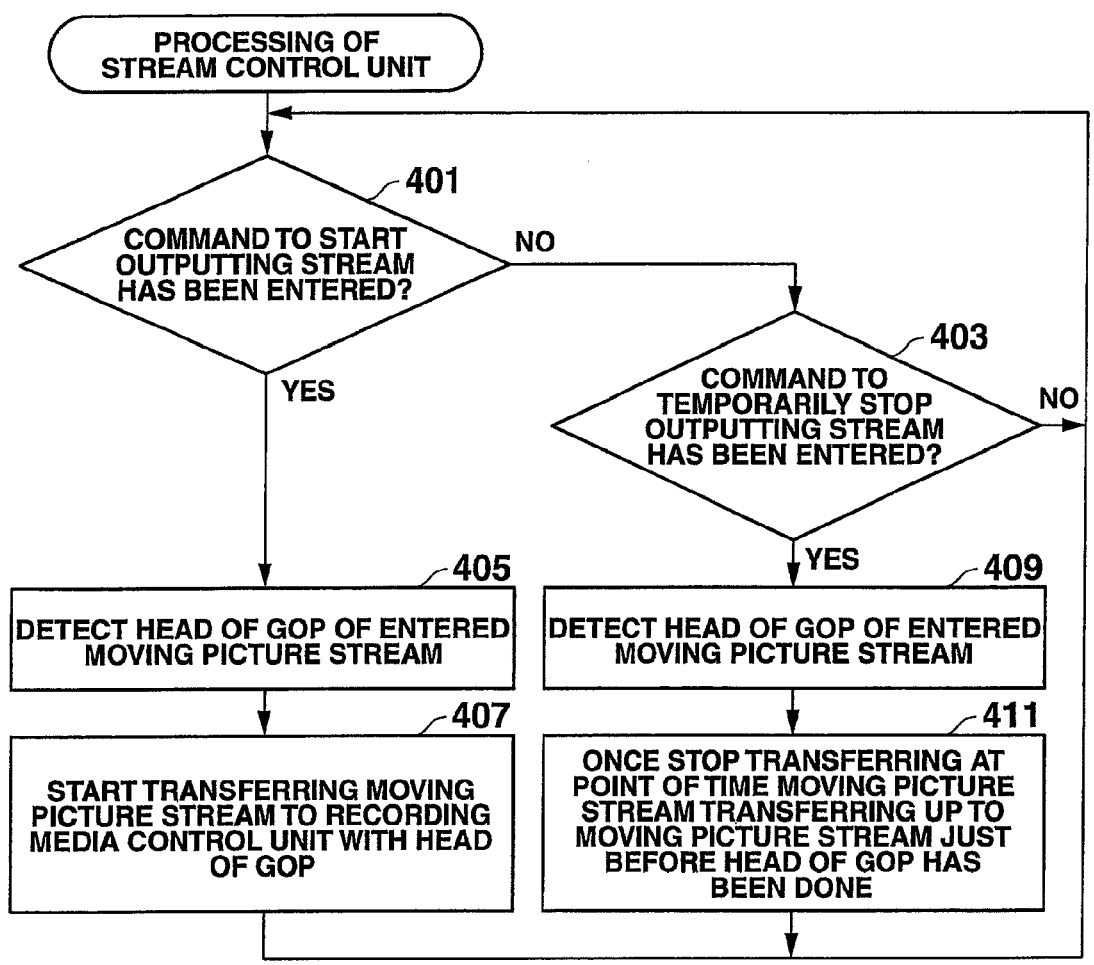
FIG. 7 is a flowchart of the processing with respect to a stream control unit.

By the way, the stream control unit 34 is placed in a waiting state until the command to start outputting the stream or to temporarily stop outputting the stream is supplied from the CPU 60, while repeating the procedure sequence of Steps 401-403 as shown in FIG. 7.

If the command (that is, the operating start command) to start outputting the stream is supplied from the CPU 60, an affirmative result is obtained at Step 401 to cause the processing by the stream control unit 34 to moves on to Step 405. At Step 405, the stream control unit 34 detects the head of GOP in the manner of retrieving the moving picture stream sent from the moving picture processing unit 33. It is noted that GOP is an abbreviation of Group of Picture, and is the same as the minimum unit established by MPEG (Moving Picture Experts Group) to make up a moving picture. 1GOP is composed of frames ranging from 1 to 18 frames, specifically, of 15 frames, for instance. Then, at Step 407, the stream control unit 34 starts transferring the moving picture stream to the recording media control unit 40 with the GOP head (usually, with the head of an I frame) having been first detected since start of retrieval. The recording media control unit 40 causes the moving picture stream sent from the stream control unit 34 to be recorded in the recording medium. Afterwards, the stream control unit 34 repeats the procedure sequence of Steps 401-403 again.

Afterward, if the command to temporarily stop outputting the stream is supplied from the CPU 60, an affirmative result is obtained at Step 403 to cause the processing by the stream control unit 34 to move on to Step 409. At Step 409, the stream control unit 34 re-detects the head of GOP. Subsequently at Step 411, the stream control unit 34 sends to the recording media control unit 40 the moving picture stream just before the detected GOP, that is, the moving picture stream up to the last of the GOP right behind the detected GOP, and temporarily stops transferring the following moving picture stream. Thereby, the recording media control unit 40 becomes conditioned to once stop recording the moving picture stream sent from the stream control unit 34.

In this manner, the stream control unit 34 enables the moving picture stream to be extracted in GOP units. Thereby, such mismatching as the absence of I and/or P frame used for reproducing a B frame may be prevented from occurring for the duration of reproducing, allowing a reproducible digested moving picture to be generated without any trouble.

With the digital camera 3 according to the third embodiment, adoption of an approach to unite the moving picture processing units into the single unit for translating the image data signal into the moving picture stream provides device downsizing as a whole, and thus may reduce an device manufacturing cost. Like the digital camera 2 according to the above second embodiment, the digital camera 3 according to the third embodiment also may realize recording of the period of time before the point of time the shutter key is pushed down, in either case of generating the ordinary moving picture stream and of generating the digested moving picture.

Figure 8:
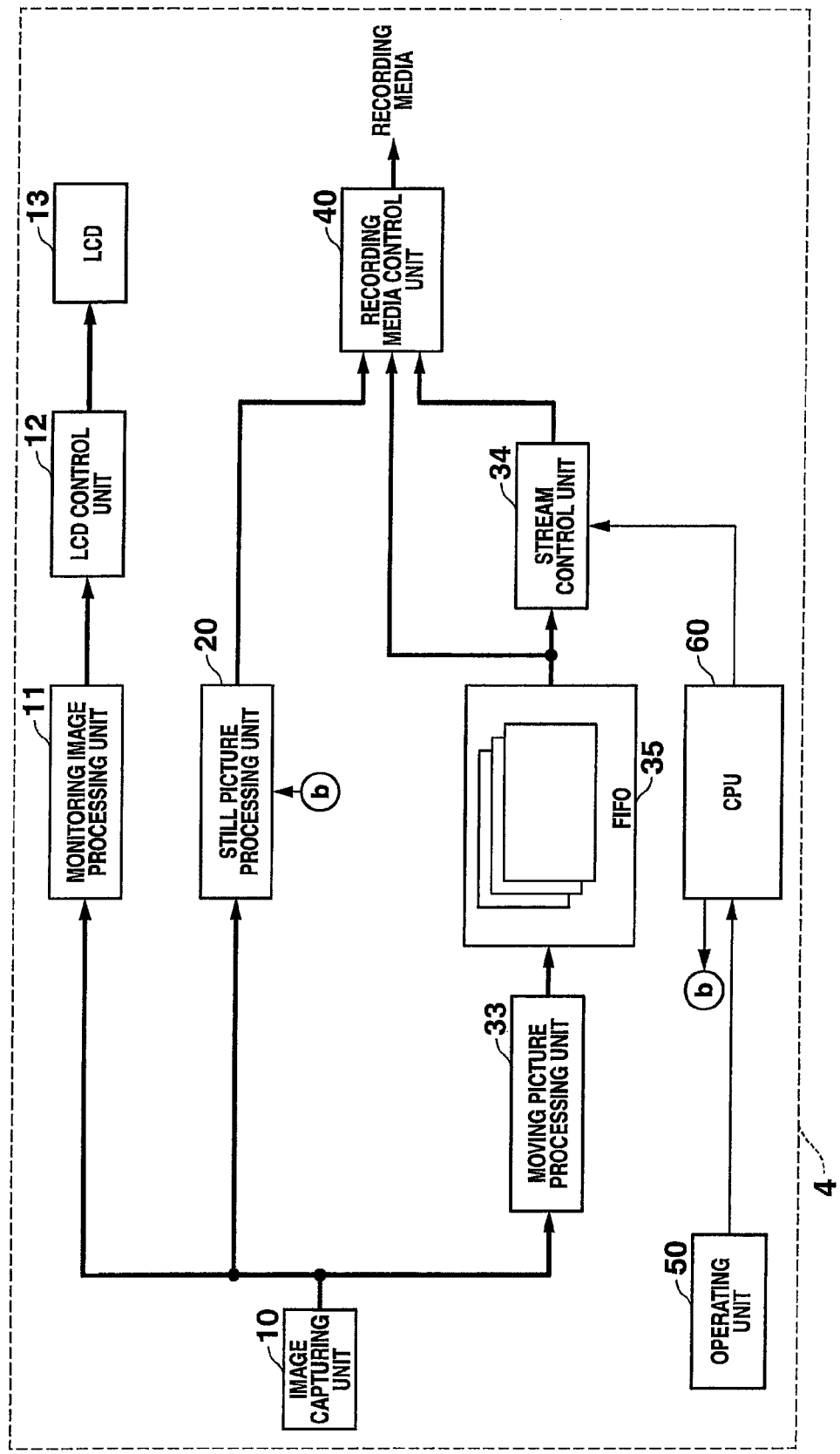
FIG. 8 is a block diagram illustrating the configuration of an image capturing device according to a fourth embodiment of the present invention.

The fourth embodiment of the present invention is now described. FIG. 8 is a block diagram illustrating the functions of a digital camera 4 according to the fourth embodiment of the present invention. Referring to FIG. 8, the digital camera 4 shown is different from the digital camera 3 shown in FIG. 5 in arranging a FIFO memory 35 at the post-stage of the moving picture processing unit 33 without providing any FIFO memory at the pre-stage of the moving picture processing unit. With the digital camera 4, the FIFO memory 35 is allowed to hold a moving picture stream having undergone data compression. Because the moving picture stream having undergone data compression is smaller in data size than the image data signal, the FIFO memory 35 may have a capacity smaller than that of the FIFO memory 31 of the digital camera 3 in order to hold the data of the same period of time as the FIFO memory 31. This results in a more reduction in manufacturing cost of the whole device.

Figure 9:
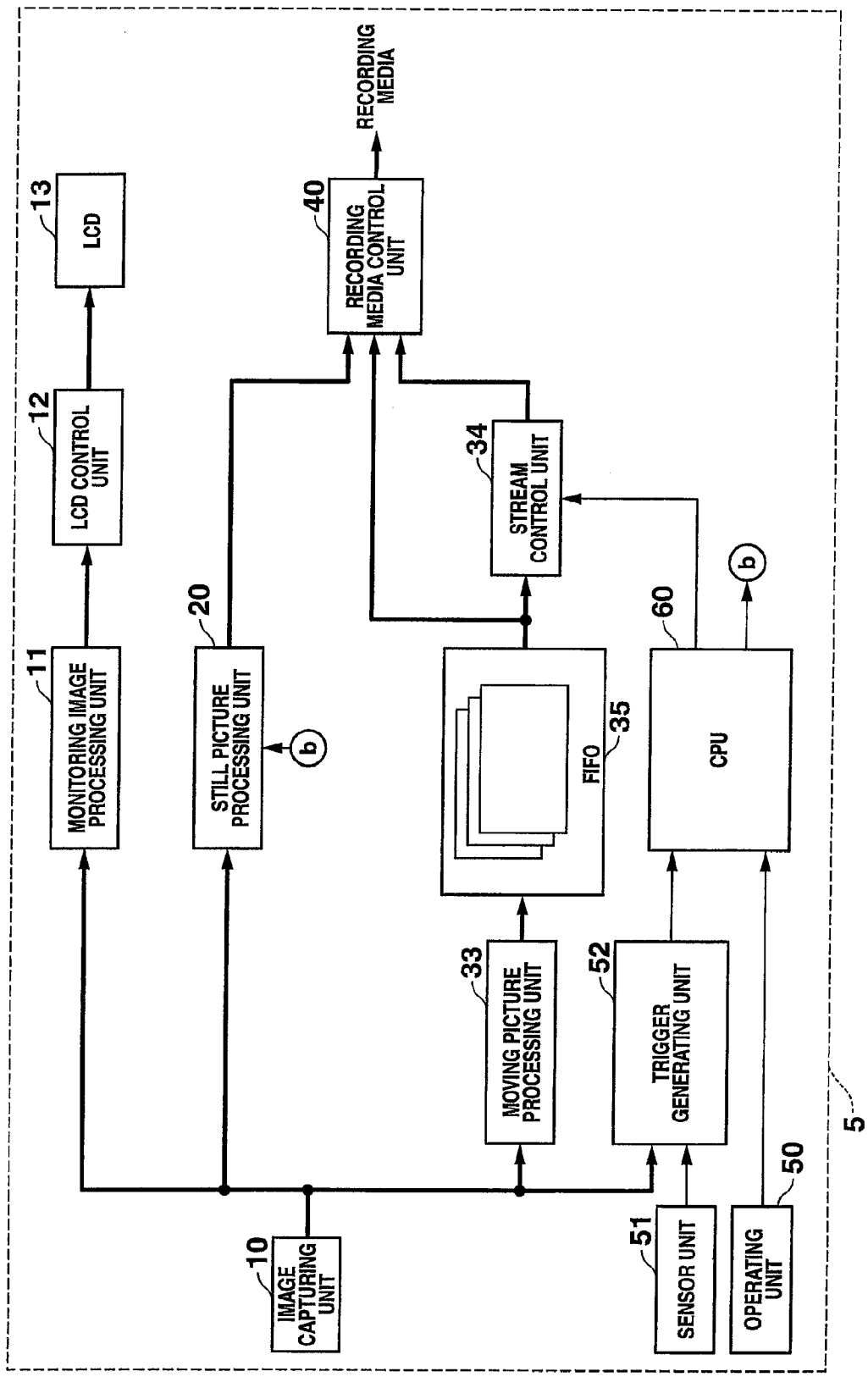
FIG. 9 is a block diagram illustrating the configuration of an image capturing device according to a fifth embodiment of the present invention.

The fifth embodiment of the present invention is now described. FIG. 9 is a block diagram illustrating the functions of a digital camera 5 according to the fifth embodiment of the present invention. Referring to FIG. 9, the digital camera 5 is different from the digital camera 4 shown in FIG. 8 in further comprising a sensor unit 51 specified as detecting unit and a trigger generating unit 52 specified as trigger signal generating unit.

It is noted that the sensor unit 51 has various types of sensors such as a gyro sensor and an acceleration sensor, as well as a circuit such as a control circuit for controlling the above various types of sensors. The sensor unit 51 outputs detection signals equivalent to posture information and displacement information detected with respect to the digital camera 5 by the gyro sensor and/or the acceleration sensor.

The image data signal from the image capturing unit 10 and/or the detection signal from the sensor unit 51 is entered into the trigger generating unit 52. The trigger generating unit 52 is adapted to, after analysis of these entered signals, determine whether or not a predetermined trigger condition has been met (or the trigger condition is established), causing a trigger signal to be generated when it is determined that the trigger condition has been met.

Figure 10:
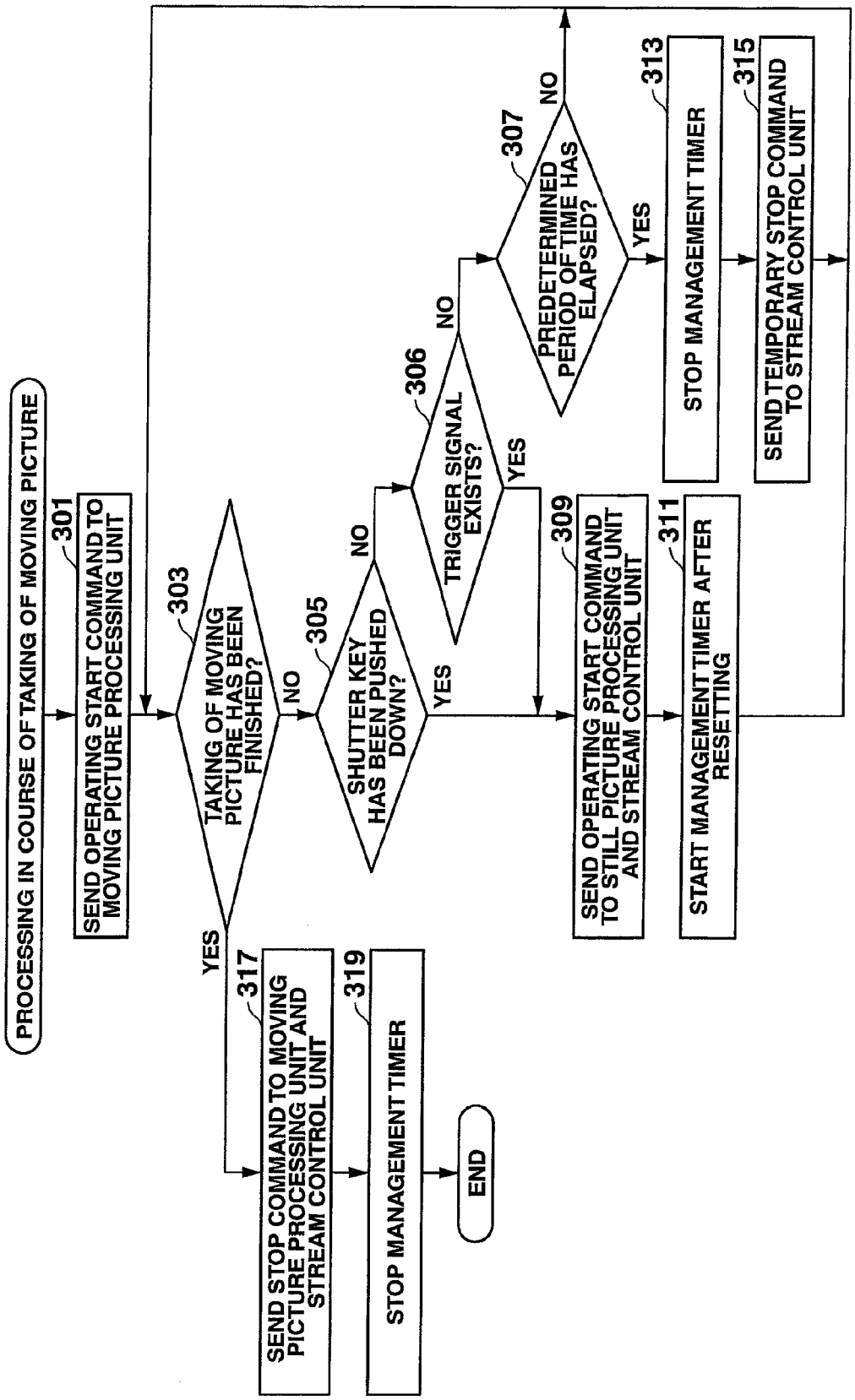
FIG. 10 is a flowchart of the processing executed by a CPU at the image capturing device shown in FIG. 9 since a user has started taking a moving picture.

The CPU 60 accepts entry of the trigger signal from the trigger generating unit 52 together with the information to the effect that the shutter key has been pushed down at the operating unit 50, and is conditioned to start taking the still picture and generating the digested moving picture upon receipt of the trigger signal. As shown in the flowchart of FIG. 10, for instance, after a negative result is obtained at Step 305, the CPU 60 determines, at Step 306, whether or not the trigger signal from the trigger generating unit 52 has been entered. If an affirmative result is obtained at Step 306, the processing by the CPU 60 moves on to Step 309, where the CPU 60 sends the operating start command to the still picture processing unit 20 and/or the stream control unit 34, and then at Step 311, causes the management timer to start time measuring after resetting. It is noted that the flowchart shown in FIG. 10 is the same as the flowchart shown in FIG. 6 in procedure sequence, except trigger signal determining processing, and hence, a detailed description on the processing other than the trigger signal determining processing is omitted.

The trigger condition that may be set at the trigger generating unit 52 is available in various types.

For instance, it is possible to make it a trigger condition that acceleration outputted from the acceleration sensor of the sensor unit 51 reaches a predetermined value or above. If a decisive moment happens, the user is supposed to act so as to move the digital camera 5 in one's attempt to direct a visual field of the digital camera 5 toward the subject to be imaged. Thus, the trigger generating unit 52 detects the acceleration occurring depending on the degree to which the camera is moved, causing the trigger signal to be generated when the detected acceleration reaches a predetermined threshold or above. Upon receipt of the generated trigger signal, the CPU 60 sends the operating start command to the stream control unit 34. In this manner, it becomes possible to generate the digested moving picture without letting the user pass up the decisive moment.

For instance, it is also possible to make it a trigger condition that the digital camera 5 is brought to a standstill. In this case, the trigger generating unit 52 calculates a change in position and/or acceleration of the digital camera 5 based on the detection signal (or the signal from the acceleration sensor and/or the gyro sensor) from the sensor unit 51. Then, the trigger generating unit 52 determines whether or not the digital camera 5 is in process of panning or tilting or under great camera shaking, in other words, whether or not the digital camera 5 is at a standstill. When it is determined that the digital camera 5 is at a standstill, the trigger generating unit 52 may output the trigger signal to the CPU 60. If the acceleration outputted from the acceleration sensor of the sensor unit 51 reaches a predetermined value or below, for instance, the trigger generating unit 52 determines that the digital camera 5 is brought to a standstill, and thus may output the trigger signal to the CPU 60.

It is also possible to make it a trigger condition that a specific subject has taken possession of the visual field of the camera. In this case, provided that an image such as a template image of the specific subject is preliminarily held in the trigger generating unit 52, the trigger generating unit 52 operates a correlation between the image data based on the image data signal from the image capturing unit 10 and the template image. Then, in the presence of a region having a high correlation (or a high coincidence) with the held template image, the trigger generating unit 52 determines that the specific subject has taken possession of the visual field of the camera, and thus may output the trigger signal to the CPU 60.

It is also possible to make it a trigger condition that the specific subject has changed from a stationary state into a dynamic state. In this case, for instance, the trigger generating unit 52 calculates, based on the image data signal from the image capturing unit 10, an inter-frame difference in luminance value of each pixel contained in the image data. Then, if a value (the sum of absolute values or squares of the difference, for instance) indicating the degree of the inter-frame difference in the above luminance value exceeds a predetermined value, the trigger generating unit 52 determines that the subject has shifted its position, and thus may output the trigger signal to the CPU 60. Alternatively, it is also allowable to detect, based on a motion vector, that the subject has shifted its position. In this case, it is necessary to take such a configuration that the moving picture processing unit 33 is adapted to output the motion vector, causing the outputted motion vector to be entered into the trigger generating unit 52. If it is detected that the motion vector within a specific region exceeds a predetermined value, the trigger generating unit 52 determines that the subject has shifted its position, and thus may output the trigger signal to the CPU 60.

Likewise, it is also possible to make it a trigger condition that the specific subject has changed from the dynamic state into the stationary state. In this case, for instance, the trigger generating unit 52 is only needed to make it a condition for determination that a value indicating the degree of the above inter-frame difference reaches a predetermined value or below. Alternatively, the trigger generating unit 52 may also make it a condition for determination that all the motion vectors within the frame are not more than a predetermined value. It is noted that the above trigger condition may be also expressed in another terms as that the subject to be imaged has been captured by the camera.

Furthermore, it is also possible to make it a trigger condition that a shift in position from an ill-lighted room to a well-lighted place has occurred. In this case, the trigger generating unit 52 may detect whether or not the trigger condition has been met, if merely performing, based on the image data signal from the image capturing unit 10, calculations of a change in luminance value of the whole image data of the supplied image data signal. Alternatively, it is also allowable to make it a trigger condition that a candle has been snuffed out or a fluorescent light has been turned on. In such a case, for instance, the trigger generating unit 52 may detect whether or not the trigger condition has been met, if merely performing, based on the image data signal from the image capturing unit 10, calculations of a change in color of the image data of the supplied image data signal.

is noted that the digital camera 5 has a sound input unit (not shown) to provide sound recording together with image recording, and it therefore follows that a change in sound recorded together with the image may be included in the trigger condition. For instance, calls such as "Let's start" may be also set as the trigger condition. In addition, provided that the sensor unit 51 having sensors such as a temperature sensor, a humidity sensor and a bio sensor for detecting user's vital information is used to detect information such as a change in temperature and/or humidity and a degree of user's tension, it is also allowable to apply the detected information to the trigger condition. Alternatively, provided that the sensor unit 51 having a sensor such as an infrared sensor is used, it is also allowable to make it a trigger condition that something has gone across the visual field of the digital camera 5.

In this manner, the digital camera 5 according to the fifth embodiment of the present invention makes it possible to generate the digested moving picture by setting, as the trigger condition, the conditions other than that the shutter key has been pushed down. Provided that various types of trigger conditions are set to ensure that the digested moving picture may be generated in response to the trigger signal generated from the trigger generating unit 52, it becomes possible to cause generation of the digested moving picture without the need for the user to frequently push down the shutter key. Accordingly, in addition to a relief from user's burden of tasks in recording, it becomes possible to provide a digested moving picture of much interest.

As having been described the above, according to each of the above embodiments, the moving picture stream of the digested moving picture is generated for the predetermined period of time, whenever some trigger condition, inclusive of the condition that the shutter key of the operating unit 50 has been pushed down, is met, while the moving picture stream based on the image data signal from the image capturing unit 10 is in process of being generated. This allows a short-time moving picture stream to be generated at the same time as generation of a long-time moving picture stream. The generated short-time moving picture stream forms the digested moving picture with respect to the long-time moving picture stream. In this manner, the digested moving picture data is generated at the same time as long-time recording, resulting in no need for the user to do editing of the moving picture data. The generated moving picture is already as complete as the digested moving picture, and is reproducible independently. Thus, the necessity to use a reproducing device having dedicated application software to reproduce the digested moving picture will be eliminated, resulting in an increase of the user's convenience at the time of generating and reproducing the digested moving picture.

The sixth embodiment of the present invention is now described. Each of the above embodiments has been described as related to the case where the digested moving picture is generated with the image capturing device at the same time as recording. However, the sixth embodiment of the present invention is described about an image generating device for generating the digested moving picture of the already recorded moving picture data.

Figure 11:
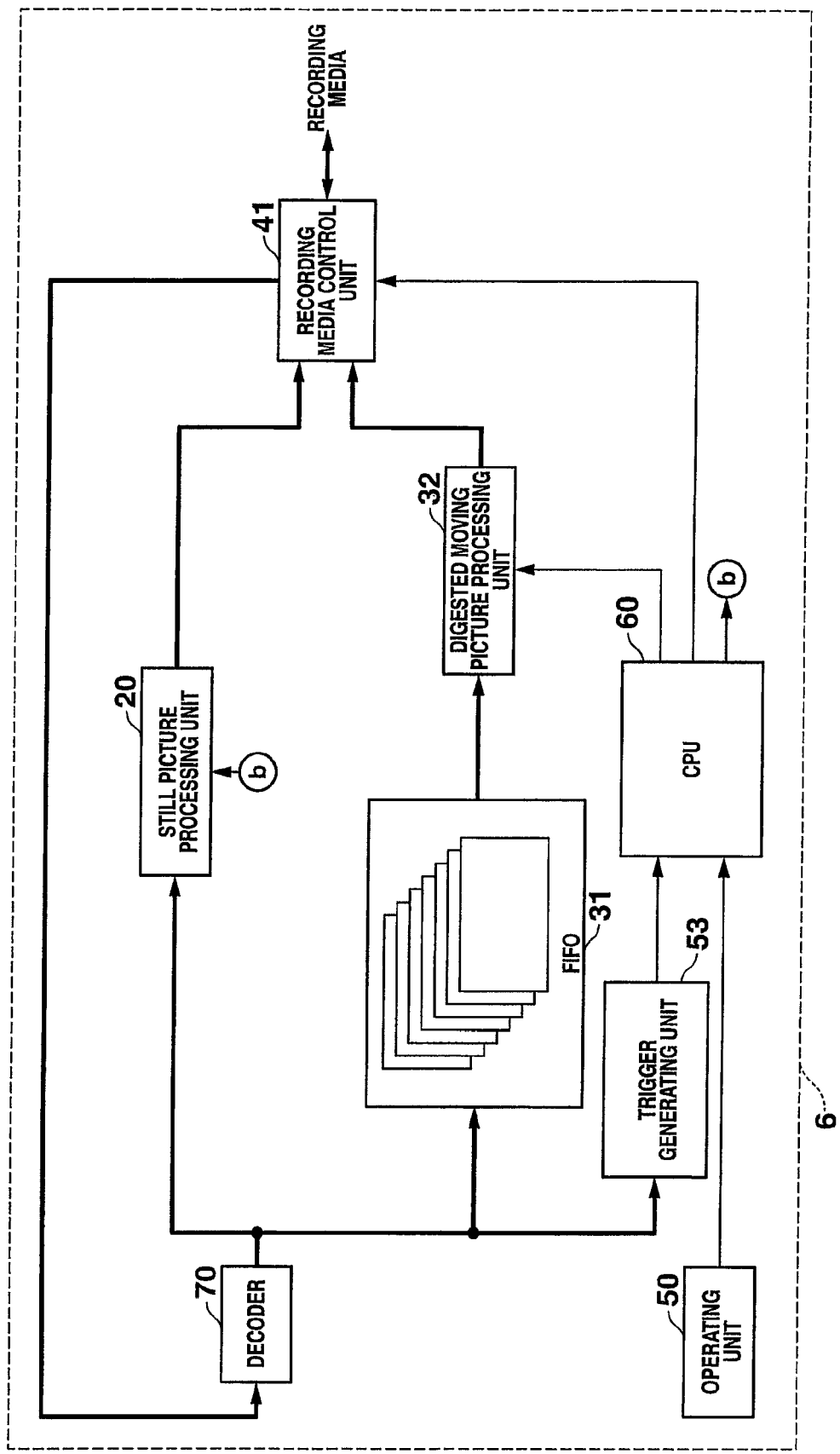
FIG. 11 is a block diagram illustrating the configuration of an image generating device according to a sixth embodiment of the present invention.

FIG. 11 is a block diagram illustrating the functions of an image generating device 6 according to the sixth embodiment of the present invention. As shown in FIG. 11, the image generating device 6 comprises a recording media control unit 41, a decoder 70, a still picture processing unit 20, a FIFO memory 31, a digested moving picture processing unit 32, a trigger generating unit 53, a CPU 60 and an operating unit 50. It is noted that for the sixth embodiment, the members or the units that are the same as each of the above embodiments are denoted by the same reference numerals, and hence, their description is omitted.

The recording media control unit 41 accepts entry of the still picture data from the still picture processing unit 20 and the moving picture stream from the digested moving picture processing unit 32, resulting in writing these data on the recording media connected to the image generating device 6. The recording media control unit 41 is also adapted to read out and output the moving picture stream from the recording media in accordance with a command from the CPU 60.

The decoder 70 decodes the moving picture stream read by the recording media control unit 41 to generate the image data signal and/or an audio signal, resulting in outputting the generated signal to the still picture processing unit 20, the FIFO memory 31 and the trigger generating unit 53.

The trigger generating unit 53 analyzes the image data signal and/or the audio signal outputted from the decoder 70, and then outputs the trigger signal to the CPU 60 when the result of the above analysis is that the predetermined trigger condition has been met. For the trigger conditions in this case, it is also possible to set the trigger conditions similar to those as previously described in the above fifth embodiment.

If a command to generate the digested moving picture is given through the user's operation at the operating unit 50, the CPU 60 causes the recording media control unit 41 to start reading out the moving picture stream from the recording medium. In response to the command, the recording media control unit 41 starts reading out the moving picture stream from the recording medium. The read moving picture stream is decoded by the decoder 70, and the image data signal outputted from the decoder 70 is entered into the trigger generating unit 53. If the predetermined trigger condition has been met, the trigger signal is outputted from the trigger generating unit 53 to the CPU 60. Upon receipt of the trigger signal, the CPU 60 causes the digested moving picture processing unit 32 to generate the digested moving picture. Then, the recording media control unit 41 causes the generated digested moving picture to be recorded in the recording medium. The flow of the processing executed by the CPU 60 in this case is the same as the processing in the course of taking of the moving picture by the CPU 60 in the first embodiment, and hence, their detailed description is omitted.

As having been described the above, the image generating device according to the sixth embodiment of the present invention enables the digested moving picture independently reproducible without the use of the dedicated application software to be generated also from the already recorded moving picture without the need for the user to do editing of the moving picture data.

It is noted that the moving picture stream of the digested moving picture may be generated not only from the image data signal sent from the image capturing unit 10, like the above first and second embodiments, but also by extraction from the moving picture stream resulting from long-time recording, like the above third to fifth embodiments. It is also noted that for extraction from the moving picture stream resulting from long-time recording, it is always necessary to be conditioned to cut out the moving picture stream with the head of GOP to ensure that reproducing of the digested moving picture is provided without the trouble.

By the way, in each of the above embodiments, it has been stated that the FIFO memory 31 or 35 is applied to ensure that the moving picture stream before the point of time the trigger condition is met may be generated. This allows the digested moving picture to also involve the moving picture immediately before the point of time the trigger signal is generated, resulting in an increase of the possibility that the user may seize the decisive moment.

In each of the above embodiments, it has been also stated that the FIFO memory 31 or 35 has the capacity sufficient to hold the moving picture stream of the period of three seconds, and therefore, the set time of the management timer is given as six seconds. However, it is to be understood that the present invention is not limited to the above as a matter of course. For instance, it is also allowable to set such that the FIFO memory 31 or 35 has a capacity sufficient to hold the moving picture stream of the period of five seconds, and therefore, the set time of the management timer is given as ten seconds. Or, setting other than the above is also possible. Alternatively, it is also allowable to make the above setting variable depending on the user's operation.

It is noted that no use of the FIFO memory 31 or 35 is of course possible. In this case, the moving picture stream is supposed to be generated from the point of time the trigger signal has been generated.

In the above fifth embodiment, it has been also stated that the sensor unit 51 and the trigger generating unit 52 are provided to ensure that various types of trigger conditions may be set, in addition to the condition that the shutter key has been pushed down. However, it is to be understood that each of the digital cameras 1, 2, 3, and 4 according to the above first, second, third and fourth embodiments may of course have the above type of the sensor unit 51 and the trigger generating unit 52 as well.

In each of the above first to fifth embodiments, it has been also stated that the recording media control unit 40 is limited in number to one. However, it is to be understood that the recording media control unit for each data to be recorded may be provided to ensure that the respective recording media control units allow the respective data to be recorded in the recording media independently.

In each of the above embodiments, it has been also stated that the moving picture stream generated by the ordinary moving picture processing unit 30 or the moving picture processing unit 33, the still picture data and the moving picture stream of the digested moving picture are recorded individually in three pieces of recording media. However, it is to be understood that it is also allowable to record these moving picture streams and the still picture data in a shared recording medium. Alternatively, provided that the still picture data and the moving picture stream of the digested moving picture are recorded in a shared recording medium, it is also allowable to record only the moving picture stream generated by the ordinary moving picture processing unit 30 or the moving picture processing unit 33 in a recording medium different from the above.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An image capturing device comprising:
    an image capturing unit for capturing a subject image to obtain an image signal;
    a first moving picture data generating unit for generating first moving picture data based on the image signal;
    a trigger signal generating unit for generating a trigger signal, every time a predetermined trigger condition is met, while the first moving picture data generating unit is in process of generating the first moving picture data;
    a second moving picture data generating unit for generating second moving picture data by performing, every time the trigger signal is generated, a process of extracting, from the first moving picture data, the moving picture data ranging from the moving picture data at a head of GOP entered immediately after generation of the trigger signal to the moving picture data just before a head of GOP entered immediately after a lapse of a predetermined period of time;
    a delay unit for delaying entry of the first moving picture data into the second moving picture data generating unit; and
    a recording unit for recording the first moving picture data delayed by the delay unit and the second moving picture data.

2. The image capturing device according to claim 1, further comprising:
    a still picture data generating unit for generating, every time the predetermined trigger condition is met, still picture data based on the image signal at the point of time the trigger signal has been generated,
    wherein the recording unit further effects recording of the still picture data.

3. The image capturing device according to claim 1, further comprising:
    a detecting unit for detecting information for determining whether the predetermined trigger condition is met,
    wherein the trigger signal generating unit generates the trigger signal when it is determined, based on the information detected by the detecting unit, that the predetermined trigger condition is met.

4. The image capturing device according to claim 1, wherein the detecting unit includes an acceleration sensor, and
    wherein the trigger signal generating unit generates the trigger signal when an acceleration detected by the acceleration sensor reaches or exceeds a predetermined value.

5. The image capturing device according to claim 4, wherein the recording unit comprises a first recording medium adapted to record the first moving picture data delayed by the delay unit and a second recording medium adapted to record the second moving picture data.

6. A method of generating a moving picture of an image capturing device, the image capturing device comprising an image capturing unit for capturing a subject image to obtain an image signal, the method comprising:
    repeatedly determining whether a predetermined trigger condition has been met, while first moving picture data based on the image signal from the image capturing unit is in process of being generated;
    retaining the first moving picture data for a predetermined time duration;
    generating second moving picture data by performing, every time the trigger condition is met, a process of extracting, from the first moving picture data having undergone the retaining process, the moving picture data ranging from the moving picture data at a head of GOP entered immediately after the trigger condition being met to the moving picture data just before a head of GOP entered immediately after a lapse of a predetermined period of time; and
    recording the first moving picture data having undergone the retaining process and the second moving picture data in a recording medium.

7. A non-transitory computer readable storage medium having a program stored thereon that is executable by a computer of an image capturing device, the image capturing device comprising an image capturing unit for capturing a subject image to obtain an image signal, the program being executable by the computer to perform functions comprising:
    repeatedly determining whether a predetermined condition has been met, while first moving picture data based on the image signal from the image capturing unit is in process of being generated;
    retaining the first moving picture data for a predetermined time duration;
    generating second moving picture data by performing, every time the trigger condition is met, a process of extracting, from the first moving picture data having undergone the retaining process, the moving picture data ranging from the moving picture data at a head of GOP entered immediately after the trigger condition being met to the moving picture data just before a head of GOP entered immediately after a lapse of a predetermined period of time; and
    recording the first moving picture data having undergone the retaining process and the second moving picture data in a recording medium.

* * * * *